United States Patent [19]
Fletcher

[11] 3,722,817
[45] Mar. 27, 1973

[54] SPRAYER

[76] Inventor: Albert B. Fletcher, Spalding, Nebr. 68665

[22] Filed: Jan. 25, 1971

[21] Appl. No.: 109,575

Related U.S. Application Data

[63] Continuation-in-part of Ser. No. 768,574, Aug. 19, 1968, abandoned, which is a continuation of Ser. No. 510,138, Nov. 8, 1965, abandoned.

[52] U.S. Cl. ................................................. 239/77
[51] Int. Cl. .................................................. B05b 7/24
[58] Field of Search ................................... 239/77, 78

[56] References Cited

UNITED STATES PATENTS

| | | | |
|---|---|---|---|
| 2,587,965 | 3/1952 | Campbell | 239/77 X |
| 2,975,543 | 3/1961 | Funk | 239/77 X |
| 2,938,672 | 5/1960 | Glatfelter | 239/77 |
| 2,886,249 | 5/1959 | Sidlow | 239/77 |
| 3,164,324 | 1/1965 | Bruinsma | 239/77 |

*Primary Examiner*—M. Henson Wood, Jr.
*Assistant Examiner*—John J. Love
*Attorney*—Hiram A. Sturges

[57] ABSTRACT

A livestock sprayer adapted to be mounted on the rearward end of a tractor for spraying cattle and other livestock with liquid insecticide, the sprayer having at its rearward end an air blower and a liquid insecticide nozzle means quickly directable together from one side of the sprayer to the other, a rapid rotation manual control means at a forward end of the sprayer for control by the tractor driver himself and controlling the direction of spraying by directing said blower and said nozzle means.

The sprayer having adjustably positionable gear and shaft means drivably connecting the crank handle means and blower housing.

11 Claims, 8 Drawing Figures

Patented March 27, 1973

INVENTOR.
ALBERT B. FLETCHER

Patented March 27, 1973 3,722,817

INVENTOR.
ALBERT B. FLETCHER

INVENTOR.
ALBERT B. FLETCHER

SPRAYER

This application is a continuation-in-part of the applicant's co-pending patent application Ser. No. 768,574, filed Aug. 19, 1968, now abandoned and titled SPRAYER, which latter was copending from the applicant's application Ser. No. 510,138, filed Nov. 18, 1965 now abandoned.

FIELD OF THE INVENTION

This invention is in the field of livestock sprayers.

DESCRIPTION OF THE PRIOR ART

Most sprayers of the prior art have been or row crops and orchards and have been of both powder-dust and liquid types.

Animals cannot be sprayed with dust because the powdered dust gets in their eyes and causes them to choke.

Hoses spraying concentrated chemicals have been used on animals in the prior art. However, such hoses use a high pressure because they are throwing liquid instead of mist. In the use of such hoses, cattle must be concentrated close together, as is a disadvantage, because bringing cattle in from the field so as to move them in close together causes them to lose weight while they are being herded in to a concentrated area for hosing.

Hoses have the disadvantage that the concentrated chemical they use tends to fall off of the cattle. Since the chemical is expensive, this involves great waste.

However, throwing insecticide onto cattle by means of hoses means low cost in equipment. For this reason, it is very important that a machine for delivering insecticide to cattle be extremely economical in its original cost and extremely efficient in its operation in order to compete.

For cattle spraying, it is important that a maximum of labor economy be available but prior art fluid sprayers for row crops have had the expensive disadvantage of requiring two operators, one to drive the tractor and one to aim the sprayer. Such high labor costs have made the orchard and row crop fluid sprayers impractical for use as cattle sprayers.

Prior art liquid sprayers have not had the combination of features (1) and (2), feature (1) being a machine in which spray is adapted to be directed both to the right and left side of the sprayer by rotation of a blower housing about a horizontal axis on bearings on the blower axle itself for economy of manufacture, such direction of spraying to both right and left being important when spraying cattle because some animals of a herd are on the right while other animals are on the left of the sprayer as the sprayer moves through a herd, and feature (2) being a sprayer, the direction of spraying of which is controllable by the tractor operator from his seat without the necessity for stopping the tractor. This rotation must be through at least 100° and to direct spray to either side of the tractor.

The importance of economy of manufacture is very great in providing an insecticide spray for cattle. For that reason, the way of rotating a blower housing from one side of a machine to the other by means of rotation about a horizontal axis, is excessively expensive for the market. An example of this found in U.S. Pat. No. 2,587,965 entitled: INSECTICIDE SPRAYER, issued to J. M. Campbell on Mar. 4, 1952.

The Campbell patent did not achieve its ability to spray both to the right and the left by means of rotation of the blower to at least 100° of rotation about the blower axis, but instead achieved this only by use of auxiliary rotation about a vertical axis as involves extra mechanism at extra cost. The Campbell machine was designed for use in a way such that two operators are required, one to direct the spray and the other to operate the truck or tractor. In the Campbell patent the prime mover is indicated to be a truck body or chassis.

The only sprayer having feature (2) of patent record is in a U.S. Pat. No. 2,975,543 issued to W. W. Funk, Mar. 21, 1961, titled: APPARATUS FOR DISTRIBUTING POWDERED MATERIAL. But this patent lacks a vital feature for cattle spraying, namely, feature (3): liquid spray, as is vital, since powder dust is hard on the eyes of cattle and causes them to choke.

The Funk patent further lacks feature (4): the important economy of bearing means mounting the blower housing on the blower axle rather than on the frame, the importance of this economy will be later clarified in the summary herein.

Prior art patents have used cables to control housing rotation but they rapidly corrode in two because of the corroding action of the spraying which enters the cable between its wires, and the wires, being small, of course, corrode through more easily than a solid object, such as a gear would. chemical.

Liquid sprayers of the prior art either will not rotate at least 100° and from side to side, right and left both, or need two operators at high labor cost, or cannot be rapidly rotated by an operator for aiming because of mechanical automatic rotation with intermittent jogging oscillation movement, which is a principle limiting some sprayers.

SUMMARY OF THE INVENTION

A livestock sprayer adapted to be mounted on the rearward end of a tractor and having features (1), (2), (3) and (4) above-mentioned.

The sprayer further having feature (5): a housing rotation control shaft extending substantially from the forward side of the frame to the blower housing.

An objective is to provide feature (5) in a tractor-rear-mounted liquid cattle sprayer to eliminate the high costs of cables and pulleys and pulley mounting labor previously needed, and because chemicals sprayed will cause the wires of cables to corrode through; a shaft herein proposed will suffer also from chemical corrosion but is thicker and can remain strong, whereas the small wires of prior art cables are exposed to chemical corrosion.

The sprayer described in which the shaft-supporting bearing is adjustable upwardly and downwardly on the frame, and in which the rotation control means at the forward end of the shaft is telescopically adjustable so as to extend varying distances forwardly from the housing so as to accomodate short or tall tractor operators.

The combination described in which the manual control means is a crank means rapidly swingable for speedly adjustment of the blower housing to quickly redirect spray.

Another object is to provide the blower housing for rotation from one side of the tractor to the other by rotation about an axis through the blower axle making possible the use of economically purchasable bearing means which are mass produced making possible an economy which is very important in a sprayer delivering an airborne liquid insecticide mist for preventing insects from robbing stockmen of needed profits.

DESCRIPTION OF THE PREFERRED EMBODIMENT

The sprayer of this invention is generally indicated at 10 and has a frame 12 provided with two side fittings 20 and a top connection means 26, the fittings 20 and 26 being adapted to be attached to the lower and upper connection points of a conventional tractor implement carrying means of the type commonly referred to as a three-point hitch, not shown; such a hitch being adapted to lift an implement from the ground and thereafter to hold it in an operational and carried position at the rear of a tractor.

Figure 6:
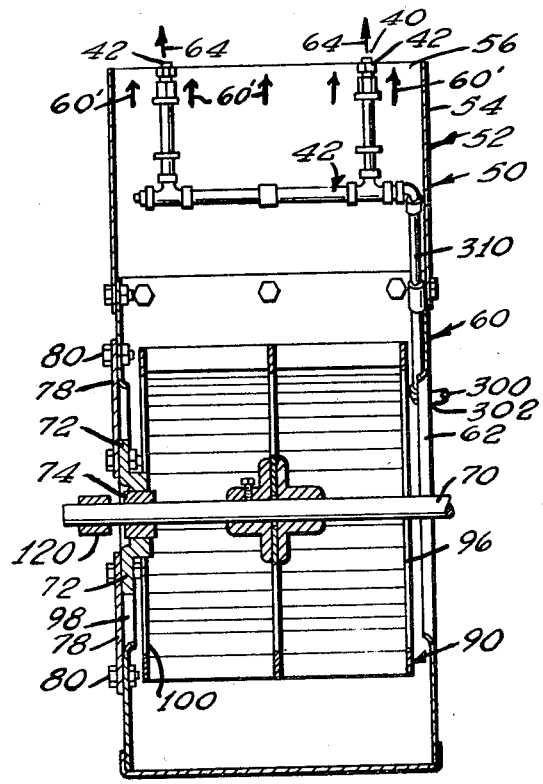
FIG. 6 is a sectional view taken along the line 6—6 of FIG. 2.
Figure 7:
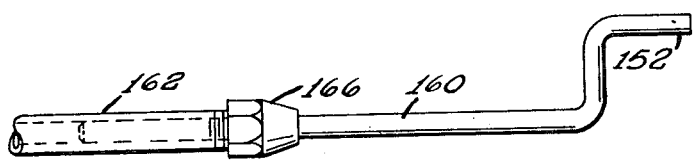
FIG. 7 is a detail of a portion of the telescoping crank handle as seen in top plan view.

As best seen in FIG. 6, nozzle means generally indicated at 40 is provided preferably in the form of a pair of nozzles 42 disposed for directing liquid-spraying chemical in the same direction.

An air-blowing means generally indicated at 50 has a housing 52 provided with an air outlet housing 54 and an outlet opening 56 disposed in the position for directing air in the direction of arrows 60' in a manner for surrounding and blowing on chemical being sprayed from the nozzles 42 in the direction of the arrows 64.

The housing 54 has its inner end attached to a main blower housing 60 having an air inlet 62, the main blower housing 60 being mounted rotatably upon an axle 70 by a bearing 72 rotatably disposed on a bearing 74, which latter rotates with respect to the axle 70, the bearing 72 is itself attached by straps 78 and bolts 80 to the housing 60 so that the housing 60 is rotatable about the axle 70.

It will be seen that the frame 12 and axle 70 define a frame and axle assembly.

A blower 90 of the squirrel cage impeller type is fixed to the axle 70 so that when the axle 70 is rotated by power later described, the blower 90 will rotate for throwing air in the direction of the arrow 60', the air coming through the inlet 62 at one end 96 of the blower and also through an inlet 98 at the other end 100 of the blower impeller 90.

As thus described, it will be seen that the mounting means provided by the axle 70 and its supporting means such as bearings 120 permits movement of the blower housing 60 in directions for directing spray through the outlet 56 both upwardly and to the sides of the frame 12.

An elongated rotatable handle generally indicated at 150 extends forwardly from the frame 12 and has convenient rotational control means such as a crank handle 152 at its forward end. The handle 150 has a telescoping shank portion generally indicated at 156 having a forward portion 160 slidable in a rearward portion 162 for adjustment but retainable in an adjusted position by suitable means 166.

Figures 1, 2:
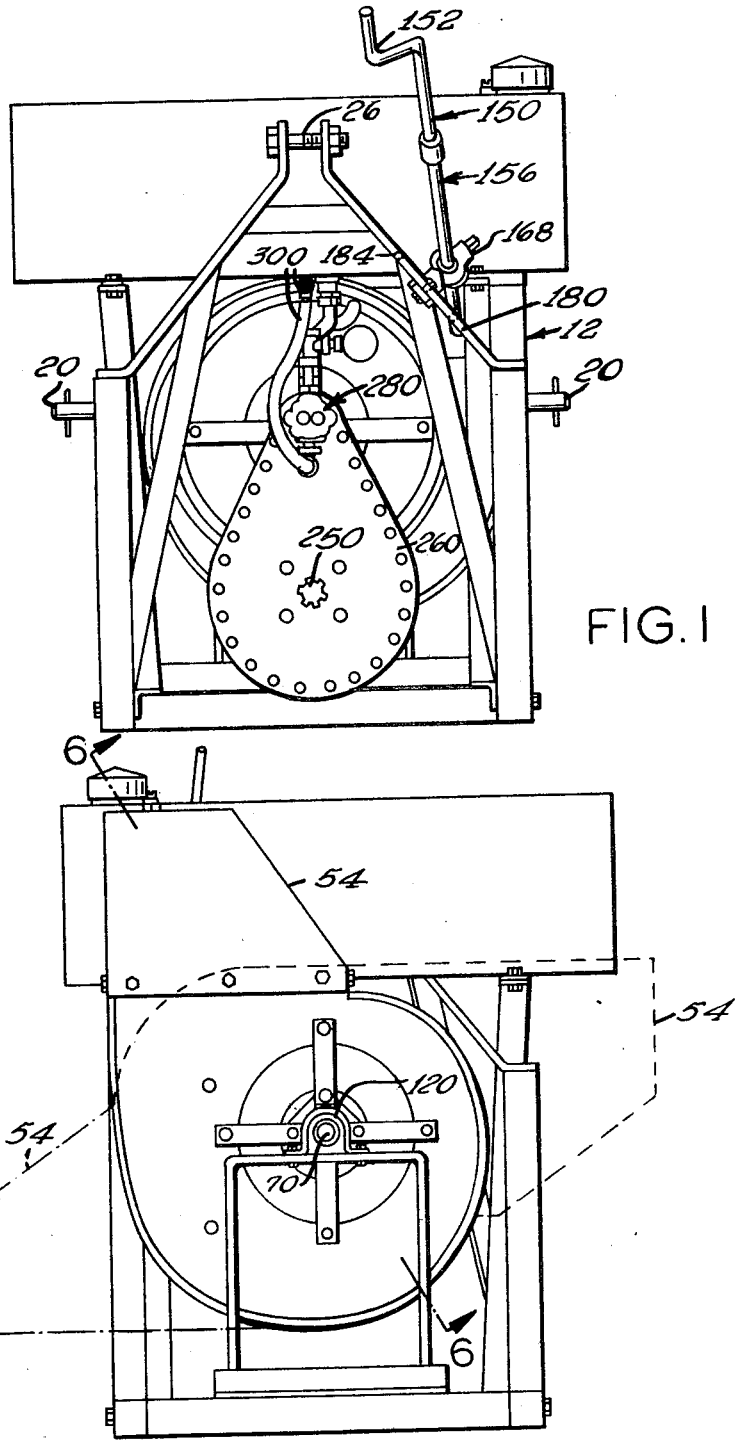
FIG. 1 is a frontal elevation of the sprayer of this invention.
FIG. 2 is a rear elevation of the sprayer with two of the optional positions of the blower outlet being shown in dotted lines.
Figure 3:
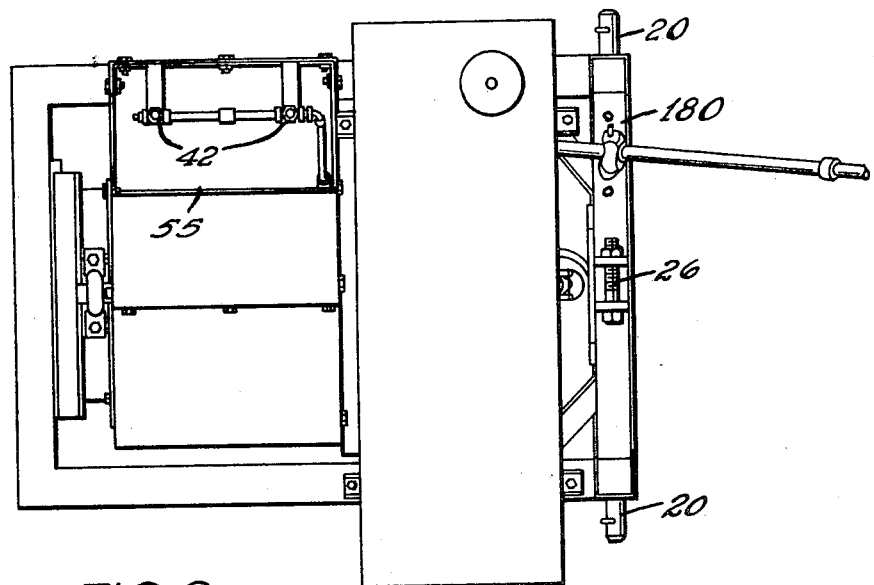
FIG. 3 is a top plan view of the sprayer.

The telescoping shank portion 156 is inclined from a lower rearward end to an upper forward end with the forward end disposed inwardly toward the center of the machine, as seen in frontal elevation in FIG. 1. The rearward portion 162 of the handle is rotatably carried in a mounting bearing 168 fixed by a bracket 170 and a bolt 172 to any one of a plurality of positions along a frame member 180, which latter extends upwardly and inwardly from a lower outer portion whereby disposal of the bolt 172 in any one of a plurality of openings 184 spaced along the frame member 180 will allow the handle 150 to be moved upwardly or downwardly and inwardly or outwardly for selective positioning.

Figure 5:
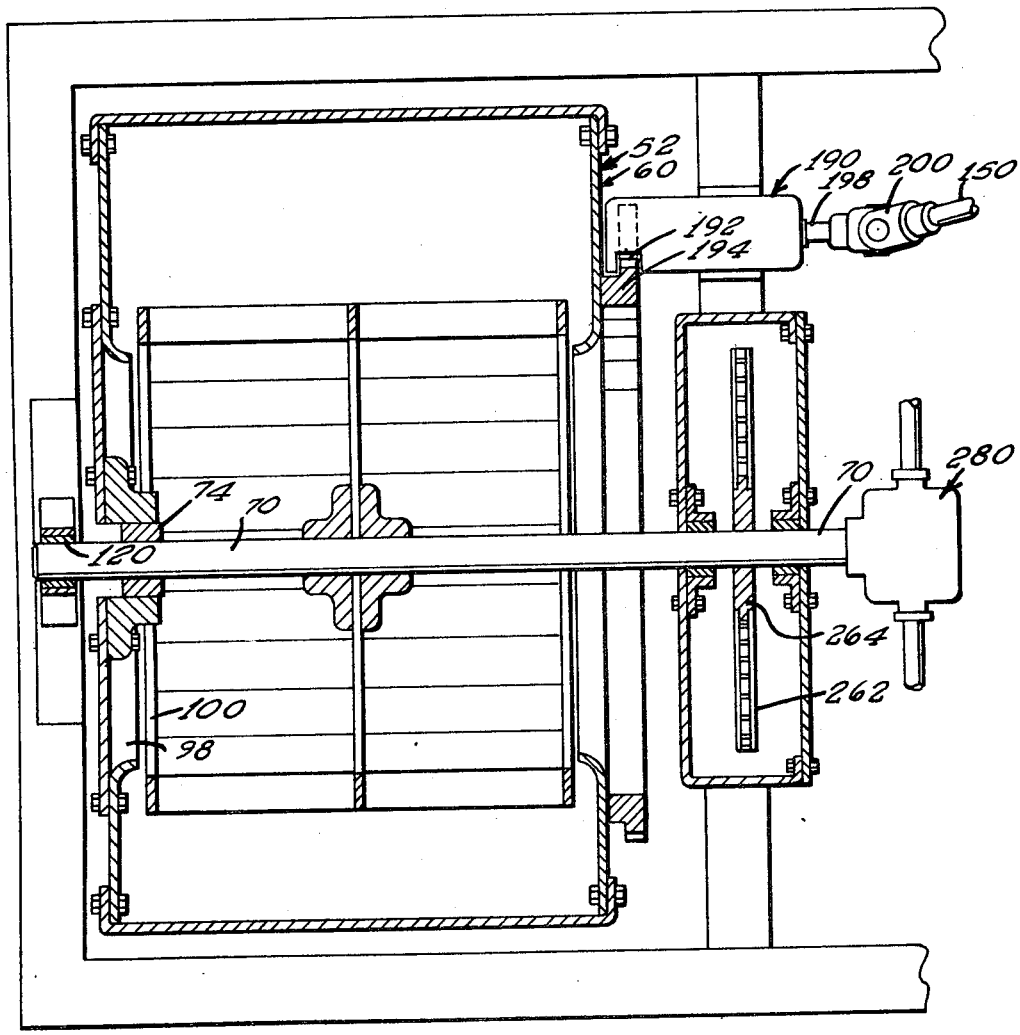
FIG. 5 is a sectional view taken along the line 5—5 of FIG. 4.

The rearward portion 162 is connected to a power transfer assembly 190, best seen in FIG. 5, which has an output pinion 192 in mesh with a large gear 194 fixed to the forward side of the main blower portion 60 of the housing 52.

Rotation of the handle 150 can control rotation of the shaft 198 of the assembly 190 as they are interconnected by a universal joint 200.

Figure 8:
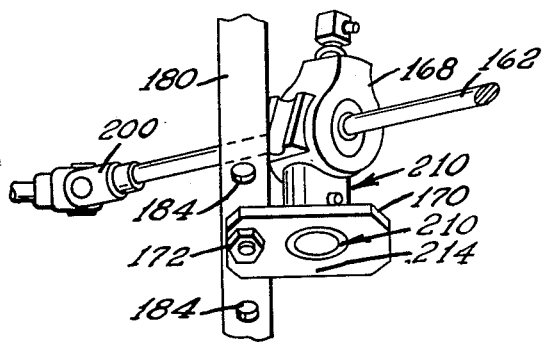
FIG. 8 is a left elevation detail of a portion of the sprayer adjacent a bearing mounting the crank handle.

As best seen in FIG. 8, the bearing 168 is attached to the bracket 170 by a swivel connection generally indicated at 210 permitting a rotation of the bearing 168 about an axis 214 disposed at 90° to the shaft portion 162 and at approximately 90° to the inclined frame member 180.

Figure 4:
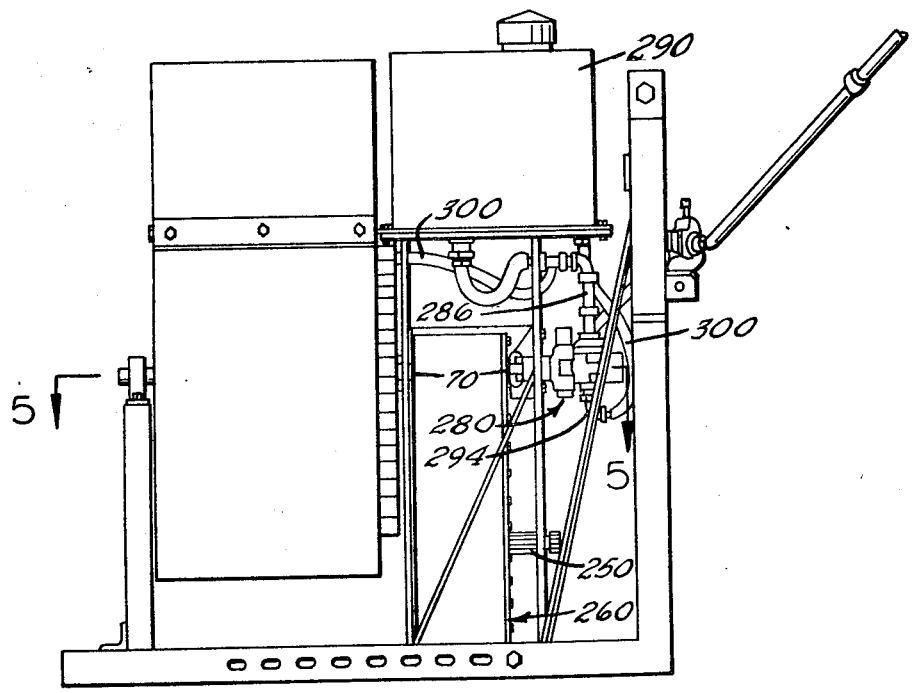
FIG. 4 is a left side elevation of the sprayer as it would be seen from the left side in FIG. 1.

Power for the blower impeller 90 is received from a tractor power take-off shaft by connection to a spined shaft 250, best seen in FIG. 4, which is connected to a speed increasing gear box 260 having an output shaft 70 rotating at a far higher speed than the shaft 250.

The output shaft 70 is, in fact, the blower axle 70 earlier described, and the axle 70 protrudes out of the rearward side of the box 260 and also out of the forward side of the box 260 where it is connected to a pump 280 of controllable pressure which has an inlet 286 connected to a spraying chemical storage tank 290, and an outlet line 294 connected to a flexible hose 300 which is attached to a nipple 302, best seen in FIG. 6, of a line 310 which leads to the nozzle means 40 delivering chemical to each of the nozzles 42.

In operation, it will be seen that the hose 300 is sufficiently long and flexible as to permit the air outlet housing 54 to be disposed directing to either side as shown in dotted lines in FIG. 2, or upwardly as seen in FIG. 2, or at any selected point therebetween, or even to be directed either farther down or up than the positions shown in FIG. 2; all positions being easily controlled by the handle 150 from the operator's seat.

As thus described, it is believed that this invention has provided a sprayer which is useful for spraying both ground crops, higher crops, and trees with great power, compactness, ease of mounting, and general efficiency.

I claim:

1. A sprayer comprising a frame having a forward end, an axle having a substantially horizontal axis extending forwardly and rearwardly with respect to said frame, means mounting said axle rotatably on said frame, a blower fixed to said axle, a blower housing disposed around said rotor and having an air outlet, nozzle means mounted on said blower housing at said air outlet and directed similarly to said air outlet, means for delivering liquid spraying chemical to said nozzle means, means mounted on said frame for driving said blower axle, said axle and frame defining a frame and axle assembly, means mounting said housing on said frame and axle assembly so that said housing can rotate with respect to said axle, said blower housing being free to rotate through at least 100 degrees about said horizontal axis and being capable of directing spray to both sides of said axle, a manual rotation control means disposed at the forward side of said frame and intermediate means operatively correlated with and connected to said manual rotation control means and operatively correlated with said blower housing in a manner for making it possible for the rotation of said blower housing through said 100 degrees and into positions for directing spray to both right and left sides of said frame, a shaft means rotatably mounted on said frame and extending forwardly from a point at the rearward end of said shaft means which latter point is adjacent said blower housing, said manual rotation control means being at the forward end of said shaft means for controlling rotation thereof, connecting means controllably connecting the rearward end of said shaft means to said blower housing in a manner for causing rotation of said housing about said axle in either one of two opposite directions when said shaft means is rotated in respective directions, shaft-supporting means mounted on said frame and rotatably supporting said shaft means, said shaftsupporting means comprising a bearing receiving said shaft means and means attaching said bearing to said frame, means connecting said manual rotation control means to the forward end of said shaft, said shaft means comprising an elongated shaft means extending substantially from the forward side of said frame rearwardly to said blower housing.

2. The combination of claim 2 in which said shaft supporting bearing attaching means attaches said bearing adjustably in a manner permitting the attachment of said bearing to said frame in various positions disposed at a substantial spacing with respect to each other upwardly and downwardly on said frame.

3. The combination of claim 1 in which said manual rotation control means on the forward end of said shaft means is adjustably and telescopically attached to the forward end of said shaft means so that the forwardmost part of said manual rotation control means can be at a varying distance from said blower housing.

4. The combination of claim 2 in which said manual rotation control means on the forward end of said shaft means is adjustably and telescopically attached to the forward end of said shaft means so that the forwardmost part of said manual rotation control means can be at a varying distance from said blower housing.

5. The sprayer of claim 1 in which said connecting means controllably connecting the rearward end of said shaft means to said blower housing comprises a universal joint means attached to the rearward end of said shaft means, a gear attached to said blower housing and a smaller gear driving said larger gear and mounted on said universal joint means.

6. The sprayer of claim 1 further comprising: said manual control means being a crank means having an inner axis and having an elongated manually grippable portion lying along an outer axis parallel to the inner axis, said grippable portion being rapidly swingable in a circle about said inner axis during rotation of an operator's hand about said outer axis.

7. The sprayer of claim 1 in which said connecting means connecting the rearward end of said shaft means to said blower housing comprises a gear attached to said blower housing and a smaller gear driving said larger gear, and means rotatably mounting said smaller gear on said frame and means drivably connecting said smaller gear to said shaft means.

8. The sprayer of claim 1 in which said connecting means connecting the rearward end of said shaft means to said blower housing comprises a universal joint means attached to the end of said shaft means.

9. The sprayer of claim 1 in which said blower housing mounting means further comprises bearing means mounting said blower housing on said axle so that said blower housing can rotate with support from said axle indirectly through said bearing means.

10. A sprayer comprising a frame having a forward end, an axle having a substantially horizontal axis extending forwardly and rearwardly with respect to said frame, means mounting said axle rotatably on said frame, a blower fixed to said axle, a blower housing disposed around said rotor and having an air outlet, nozzle means mounted on said blower housing at said air outlet and directed similarly to said air outlet, means for delivering liquid spraying chemical to said nozzle means, means mounted on said frame for driving said blower axle, said axle and frame defining a frame and axle assembly, means mounting said housing on said frame and axle assembly so that said housing can rotate with respect to said axle, said blower housing being free to rotate through at least 100 degrees about said horizontal axis and being capable of directing spray to both sides of said axle, a manual rotation control means disposed at the forward side of said frame and intermediate means operatively correlated with and connected to said manual rotation control means and operatively correlated with said blower housing in a manner for making it possible for the rotation of said blower housing through said 100 degrees and into positions for directing spray to both right and left sides of said frame, a forwardly extending shaft means, said manual rotation control means being at the forward end of said shaft means for controlling rotation thereof, connecting means controllably connecting the rearward end of said shaft means to said blower housing in a manner for causing rotation of said housing about said axle in either one of two opposite directions when said shaft means is rotated in respective directions, shaft-supporting means mounted on said frame and rotatably supporting said shaft means, said shaft-supporting means comprising a bearing receiving said shaft means and means attaching said bearing to said frame, means connecting said manual rotation control means to the forward end of said shaft, and in which said connecting means controllably connecting the rearward end of said shaft means to said blower housing comprises a larger gear attached to said housing and a smaller gear driving said larger gear, and means drivably attaching said smaller gear to said shaft means.

11. The combination of claim 10 in which said means drivably attaching said smaller gear to said shaft means comprises a universal joint.

* * * * *